United States Patent
Volkov

(10) Patent No.: US 11,620,169 B2
(45) Date of Patent: Apr. 4, 2023

(54) BARRIERLESS AND FENCELESS SHARED MEMORY SYNCHRONIZATION WITH WRITE FLAG TOGGLING

(71) Applicant: NVIDIA Corporation, Santa Clara, CA (US)

(72) Inventor: Vasily Volkov, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 114 days.

(21) Appl. No.: 16/818,845

(22) Filed: Mar. 13, 2020

(65) Prior Publication Data
US 2021/0286619 A1 Sep. 16, 2021

(51) Int. Cl.
*G06F 9/52* (2006.01)
*G06F 9/54* (2006.01)

(52) U.S. Cl.
CPC .............. *G06F 9/52* (2013.01); *G06F 9/544* (2013.01)

(58) Field of Classification Search
CPC ... G06F 9/52; G06F 9/522; G06F 9/54; G06F 9/544; G06F 9/546
See application file for complete search history.

(56) References Cited

U.S. PATENT DOCUMENTS

| | | | | | |
|---|---|---|---|---|---|
| 5,408,670 A | * | 4/1995 | Davies | ...................... | G06F 7/48 708/524 |
| 6,092,175 A | * | 7/2000 | Levy | ..................... | G06F 9/3855 712/E9.035 |
| 2004/0019777 A1 | * | 1/2004 | Wygant | ................... | G06F 9/544 713/1 |
| 2004/0030859 A1 | * | 2/2004 | Doerr | ...................... | G06F 15/80 712/15 |
| 2004/0123051 A1 | * | 6/2004 | Lloyd | ...................... | G06F 9/52 711/147 |
| 2011/0219208 A1 | | 9/2011 | Asaad et al. | | |
| 2015/0149737 A1 | * | 5/2015 | Hobson | ..................... | G06F 9/52 711/152 |

(Continued)

OTHER PUBLICATIONS

Yang, "Shared Memory Programming with Pthreads", 2010, 70 pages, Retrieved from the Internet <URL: https://sites.cs.ucsb.edu/~tyang/class/240a17/slides/pthreads.pdf>.*

(Continued)

*Primary Examiner* — David J. Huisman
(74) *Attorney, Agent, or Firm* — Leydig, Voit & Mayer, Ltd.

(57) ABSTRACT

When communicating through shared memory, a producer thread generates a value that is written to a location in a shared memory. The value is read from the shared memory by a consumer thread. The challenge is to ensure that the consumer thread reads the location only after the value is written and is thereby synchronized. When a memory location is written by a producer thread, a flag that is simultaneously stored in the memory location along with the value is toggled. The consumer thread tracks information to determine whether the flag stored in the location indicates whether the producer has written the value to the location. The flag is read and written simultaneously with reading and writing the location in memory, thereby eliminating the need for a memory fence. After all of the consumer threads read the value, the location may be reused to write additional value(s) and simultaneously toggle the flag.

19 Claims, 11 Drawing Sheets

(56) References Cited

U.S. PATENT DOCUMENTS

2016/0246527 A1 8/2016 Kogan et al.
2019/0138242 A1* 5/2019 Lewins .................. G06F 9/544

OTHER PUBLICATIONS

Stack Overflow, "Will a CPU process have at least one thread?", Feb. 2011, 3 pages, Retrieved from the Internet <URL: https://stackoverflow.com/questions/4894609/will-a-cpu-process-have-at-least-one-thread>.*
Zhu, et al., "Sparse Persistent RNNs: Squeezing Large Recurrent Networks On-Chip," ICLR (2018), pp. 1-15.

* cited by examiner

BARRIERLESS AND FENCELESS SHARED MEMORY SYNCHRONIZATION WITH WRITE FLAG TOGGLING

TECHNICAL FIELD

The present disclosure relates to shared memory synchronization, and more particularly to barrierless and fenceless shared memory synchronization.

BACKGROUND

A conventional approach to facilitating shared memory communication is to use barrier synchronization. A "barrier" refers to a routine that is executed by both producer and consumer threads and stalls each thread until all other threads have also reached the barrier. In addition, the barrier ensures that all memory writes initiated earlier have been completed, which is done by using a memory fence. The barrier ensures that the consumer threads do not access the memory locations before the memory locations contain the intended data that is written by the producer threads. The drawback of the conventional approach is twofold. First, the cost of executing the barrier synchronization routine is substantial and involves multiple roundtrips to memory. Second, if threads arrive at the barrier at different times, some of the threads will have to wait and are idle, which may increase the total computation time.

While some variants of the conventional synchronization approach may not use an explicit barrier synchronization routine, those variants still use a memory fence. An example of this variant is a semaphore. For these variant approaches, synchronization is achieved by using one or more synchronization variables. After writing the data to memory, producer threads execute a memory fence to ensure that the data is committed to memory. Then, producer threads update the synchronization variable(s). The consumer threads poll (e.g., read) the synchronization variable(s) until the synchronization variable(s) change state before proceeding to read the data from memory. The drawback for these approaches is the cost of the fence and the additional memory roundtrips. For example, implementing the memory fence requires one roundtrip to memory. The cost of communicating the change in the synchronization variable requires an additional roundtrip to memory. Yet another additional roundtrip to memory is usually required to read the data. There is a need for addressing these issues and/or other issues associated with the prior art.

SUMMARY

When communicating through shared memory, a producer thread generates a value that is written to a location in a shared memory. The value is read from the shared memory by a consumer thread. The challenge is to ensure that the consumer thread reads the location only after the value is written and is thereby synchronized. When a memory location is written by a producer thread, a flag that is simultaneously stored in the memory location along with the value is toggled. The consumer thread tracks information to determine whether the flag stored in the location indicates whether the producer has written the value to the location. The flag is read and written simultaneously with reading and writing the location in memory, thereby eliminating the need for a memory fence. After the consumer thread reads the value, the location may be reused to write additional value(s) and simultaneously toggle the flag.

A method, computer readable medium, and system are disclosed for shared memory synchronization. In an embodiment, a method comprises executing a set of threads by a multi-threaded parallel processor to process inputs according to a sequence of instructions, generating a first value by a first thread in the set of threads, and writing the first value to a first location of a shared memory simultaneously with updating a first flag stored in the first location. In an embodiment, the first flag is toggled from a first state to a second state, where the first flag is initialized to the first state when execution of the sequence of instructions is initiated. In another embodiment, the first flag is toggled from the second state to the first state, where the first flag is initialized to the second state when execution of the sequence of instructions is initiated.

In an embodiment, the method further comprises determining, by a third thread, that the first flag has changed from the first state to the second state, reading, by the third thread, the first value from the first location before a second flag stored in a second location of the shared memory to be written by a second thread in the set of threads is updated, and processing the first value by the third thread to produce an output. In an embodiment, determining the first flag has changed from the first state to the second state comprises simultaneously reading the first flag and the first value from the first location by the third thread. In an embodiment, determining the first flag has changed from the first state to the second state further comprises comparing the first flag to a valid state.

In an embodiment, the first flag is stored in a position within the first location replacing a bit of the first value. In an embodiment, the position corresponds to a least-significant bit of the first value.

In an embodiment, the first value and the first flag are encoded as one of a single 16-bit, 32-bit, 64-bit or 128-bit word.

In an embodiment, at least one additional value is associated with the first flag and, further comprising simultaneously writing the at least one additional value to the first memory location when the first value is written to the first memory location.

In an embodiment, execution of the sequence of instructions comprises execution of one or more operations using a neural network.

In an embodiment, the method further comprises writing, by the third thread, the output to a third location simultaneously with updating a third flag stored in the third location in the shared memory from the first state to the second state. In an embodiment, the method further comprises determining, by a fourth thread, that the third flag has changed from the first state to the second state, processing the output by the fourth thread to produce a fourth value, and updating the first flag stored in the first location from the second state to the first state simultaneously with writing the fourth value to the first location.

In an embodiment, a system comprises a multi-core parallel processor coupled to a shared memory and configured to: execute a set of threads to process inputs according to a sequence of instructions, generate a first value by a first thread in the set of threads, and write the first value to a first location in the shared memory simultaneously with updating a first flag stored in the first location from a first state to a second state, where the first flag is initialized to the first state when execution of the sequence of instructions is initiated.

In an embodiment, non-transitory computer-readable media stores computer instructions that, when executed by one or more processors, cause the one or more processors to perform the steps of: executing a set of threads to process inputs according to a sequence of instructions, generating a first value by a first thread in the set of threads, and writing the first value to a first location of a shared memory simultaneously with updating a first flag stored in the first location from a first state to a second state, wherein the first flag is initialized to the first state when execution of the sequence of instructions is initiated.

DETAILED DESCRIPTION

During multi-threaded processing, data is transferred from producer threads to consumer threads through shared memory. In the context of the following description, shared memory may be accessed (read and/or written) by different threads executing within a parallel processor. When communicating using shared memory, producer threads process a set of inputs and generate first values that are written to first locations in the shared memory. The first values are read from the shared memory by consumer threads and processed to generate second values that are written to second locations in the shared memory, and so on. The challenge is to ensure that the second threads read the memory locations only after the values produced by the first threads are written to the memory locations. A barrier and fence are avoided by including a flag in each memory location to which value(s) are written and writing a packet containing the flag and the value(s) in the same transaction (e.g., simultaneously). When a memory location is written, the flag is updated to indicate that the memory location has been written with valid values. In contrast with the prior art, the flag is not updated to a predetermined value to indicate that the memory location has been written. Instead, all flags are initialized to the same state (either True or False) and, each time a memory location is written, the state of the flag is toggled.

When consumer threads read the value(s) from a memory location, the value(s) are read simultaneously with the flag stored in the same location. To ensure that the read value(s) are valid, the memory location is polled (read) until the flag is found to be in the state that indicates the values are valid. The value(s) that were read together with the flag may then be used in processing, which eliminates the need for an additional roundtrip to memory to fetch the value(s) after the synchronization is done. Each thread maintains state information indicating the flag state for memory location(s) that have either already been written and are therefore valid or that need to be written and are therefore not valid. In an embodiment, the memory locations may be written by a single producer thread and read by one or more consumer threads. In an embodiment, the memory locations may be overwritten with new value(s) without reinitializing the flags. However, before a memory location is overwritten with new value(s), it is necessary to ensure that the prior value(s) stored in the memory location are no longer needed, i.e. have already been read by all consumer threads.

Figure 1A:
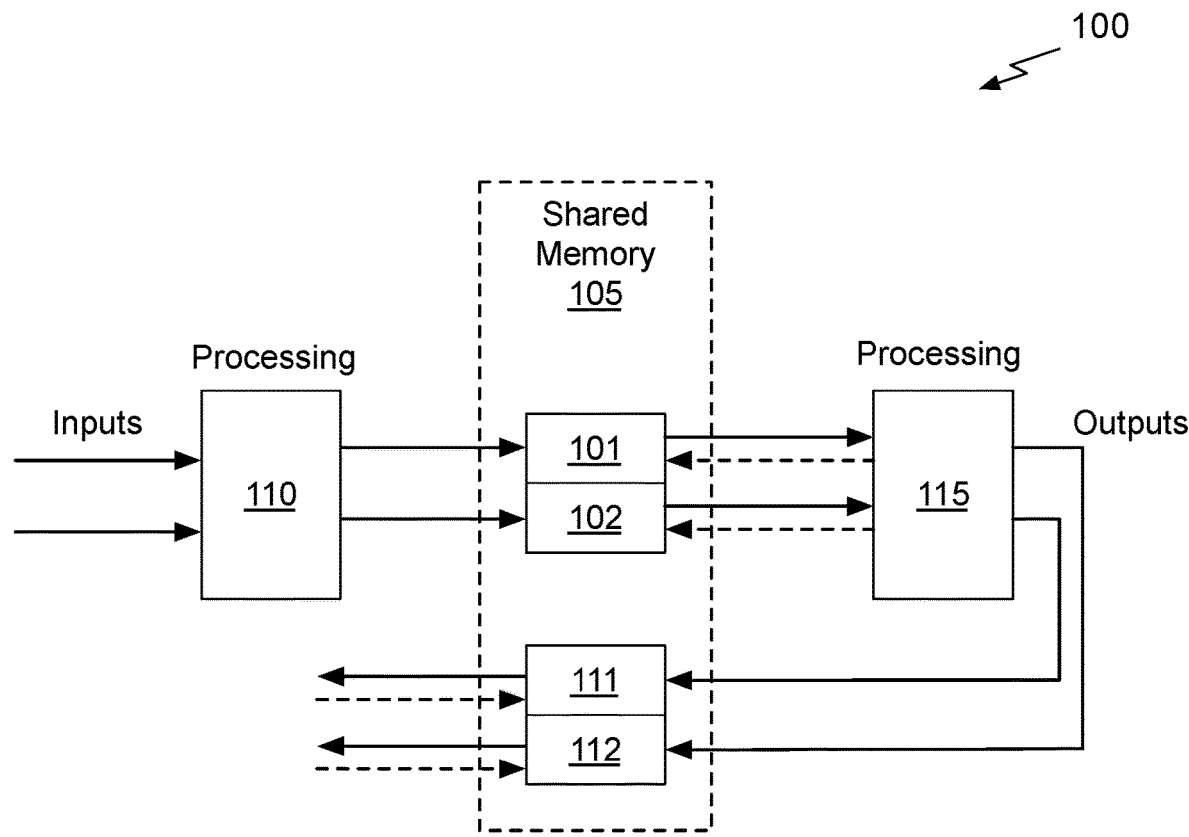
FIG. 1A illustrates a block diagram of a multi-threaded shared memory communication system, in accordance with an embodiment.

FIG. 1A illustrates a multi-threaded shared memory communication system 100, in accordance with an embodiment. Although the shared memory system 100 is described in the context of processing units, one or more of the units 110 and 115 may be implemented as a program, custom circuitry, or by a combination of custom circuitry and a program. For example, the units 110 and/or 115 may be implemented by a GPU (graphics processing unit), CPU (central processing unit), or any other type of processor. In an embodiment, units 110 and 115 implement components of a neural network. In an embodiment, the neural network is a recurrent neural network (RNN). Furthermore, persons of ordinary skill in the art will understand that any system that performs the operations of the shared memory system is within the scope and spirit of embodiments of the present disclosure.

The unit 110 is a multi-threaded parallel processing unit configured to receive inputs and process the inputs according to first instructions executed by a first set of threads to produce first values. In an embodiment, the unit 110 is a programmable streaming multiprocessor (SM) 440 shown in FIG. 4A. In an embodiment, the first instructions are a sequence of program instructions, where the program also includes at least second instructions and third instructions. The first set of threads writes the first values to the memory locations 101 and 102 simultaneously with toggling (e.g., updating) first flags stored in the memory locations 101 and 102 of a shared memory 105 from a first state to a second state. The first flags are initialized to the first state when execution of the first instructions is initiated. Alternatively, the first flags are initialized to the second state and, when the first values are written, the first flags are toggled from the second state to the first state. In an embodiment, the shared memory 105 comprises an L2 cache 460 of FIG. 5A.

The unit 115 is a multi-threaded parallel processing unit configured to read the first values simultaneously with the flags stored in the same memory locations and, when the flags indicate the first values are valid, the first values are processed according to second instructions executed by a second set of threads to produce second values. The first values may be written to the memory locations 101 and 102 at different times. Therefore, some of the second threads may read the first values from location 101 and begin processing when other of the second threads are still waiting for the data to be written to location 102. In contrast, when a single conventional barrier is used to synchronize the first threads with the second threads, none of the second threads can begin processing until all of the first threads have written the values to memory.

Each thread in the second set of threads polls (e.g. reads, as shown by the dashed arrows in FIG. 1A) the flag stored in the respective memory location to detect a change from the first state to the second state, indicating that the first values have been written to the memory location. In contrast with a prior technique, where either the first state or the second state indicates valid data and the other state indicates invalid data, neither the first nor the second state always indicates that the memory location stores valid data. In other words, interpretation of the flag state is context dependent, so that for one transaction (e.g., read or write) the first state indicates the memory location contains valid data and for another transaction, the first state indicates that the same memory location contains invalid data, as described further herein.

When a particular flag being polled by a thread indicates the values are valid (e.g., the flag has changed in response to the value being written), synchronization between the producer thread and the consumer thread is complete for the shared memory location, and the consumer thread may use the values that have been simultaneously read with the flags for a computation. As each one of the threads in the second set of threads completes processing, the thread writes the thread's portion of the second values to the memory location 111 or 112 simultaneously with toggling the second flag stored in the memory location 111 or 112, respectively, from the first state to the second state. The second values may be processed again and/or may be transmitted from the unit 115 as outputs.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
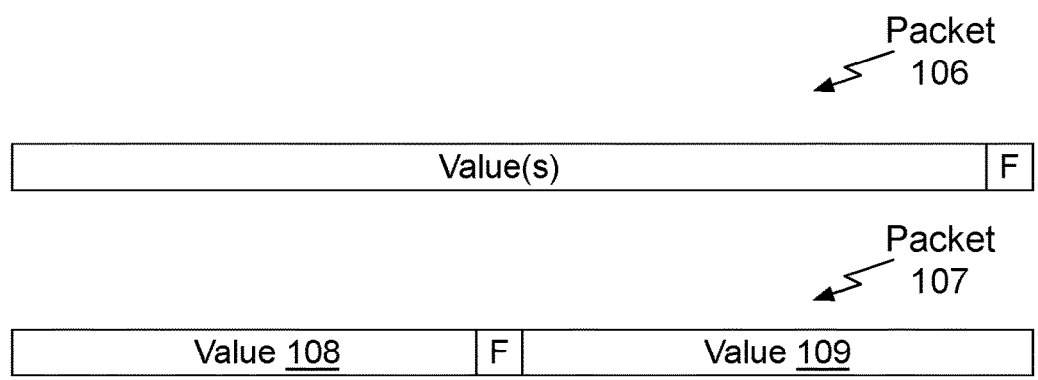
FIG. 1B illustrates a diagram of example shared memory data formats, in accordance with an embodiment.

FIG. 1B illustrates a diagram of example shared memory formats, in accordance with an embodiment. A packet 106 is stored in a memory location of a shared memory by a thread and includes at least one value and a single flag that is associated with the at least one value. Each value of the at least one value may be represented in a fixed point, floating point, or any other feasible format. In an embodiment, all bits of the value(s) produced by a thread are stored without any reduction in precision and a single bit is dedicated to the flag. In another embodiment, the flag is stored in the least significant bit (lsb) position for one of the values, thereby reducing the precision of the one value. The lsb position may be the lsb of a mantissa when the value is represented in a floating-point format. Any other values stored in the packet 106 are stored at full precision.

A packet 107 is stored in a memory location of a shared memory by a thread and includes two values 108 and 109 and a single flag that is associated with the two values 108 and 109. Each value may be represented in a fixed point, floating point, or any other feasible format. In an embodiment, all bits of the two values produced by a thread are stored without any reduction in precision and a single bit is dedicated to the flag. As shown in the packet 107, the flag may be stored in any bit position within the packet 107, including any bit position within one of the two values 108 and 109. In a particular embodiment, the flag is stored in a bit position (the lsb, or another bit) for a first one of the two values 108 and 109, thereby reducing the precision of the first value and the other value is stored in the packet 107 at full precision.

Each of the packets 106 and 107 are read entirely (atomically), so that the flag and the value(s) are read simultaneously. Each of the packets 106 and 107 are written entirely (atomically), so that the flag and the value(s) are written simultaneously. When writing a packet 106 or 107 to the shared memory 105, the producer thread sets the flag in the packet so that the flag is toggled. Specifically, a flag that is in the first state is toggled to be in the second state (e.g., from False to True or from True to False). In an embodiment, the flag and the value(s) are encoded in the packet 106 or 107 as a single 16-bit, 32-bit, 64-bit or 128-bit word, such that the flag takes a single bit in packet 106 or 107.

Figure 1C:
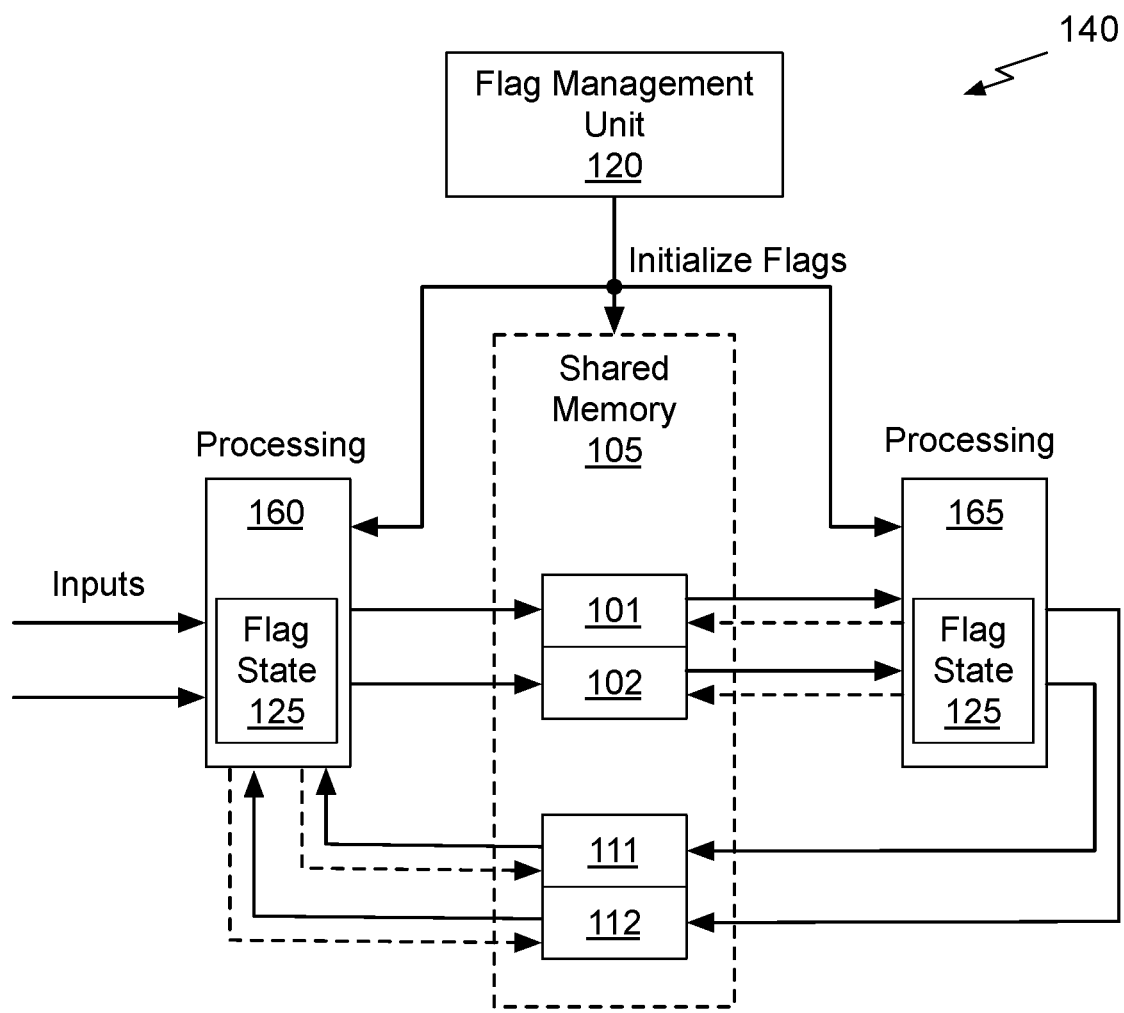
FIG. 1C illustrates a block diagram of another example multi-threaded shared memory communication system, in accordance with an embodiment.

FIG. 1C illustrates a block diagram of another example multi-threaded shared memory communication system 140, in accordance with an embodiment. Although the shared memory system 140 is described in the context of processing units, one or more of the units 160 and 165 may be implemented as a program, custom circuitry, or by a combination of custom circuitry and a program. For example, the units 160 and/or 165 may be implemented by a GPU (graphics processing unit), CPU (central processing unit), or any processor. In an embodiment, each of the units 160 and 165 is capable of implementing at least one layer of a neural network. Furthermore, persons of ordinary skill in the art will understand that any system that performs the operations of the shared memory system is within the scope and spirit of embodiments of the present disclosure.

The unit 160 is a multi-threaded parallel processing unit configured to receive the inputs and process the inputs according to the first instructions executed by the first set of threads to produce the first values. A flag management unit 120 initializes the flags to a predetermined flag state (e.g., either the first or the second state) before processing by the units 160 and 165 begins. In an embodiment, the units 160 and 165 are the programmable SM 440 shown in FIG. 4A. The first set of threads writes the first values to the memory locations 101 and 102 of the shared memory 105 simultaneously with toggling the first flags stored in the memory locations 101 and 102.

Flag states 125 within the units 160 and 165, are configured to track the flag state, providing information needed to determine which of the two states corresponds to valid values at any point in time. In an embodiment, when reading a packet from the shared memory 105, the thread reading the shared memory 105 knows the state of the flag before the packet is (or will be) written (e.g., an invalid state). In an embodiment, when reading a packet from the shared memory 105, the thread reading the shared memory 105 knows the state that the flag will have after the packet is written (e.g., a valid state). In an embodiment, the flag state 125 within the unit 165 separately tracks each flag accessed by the second threads. In an embodiment, the flag state 125 within the unit 165 tracks all of the flags accessed by the second set of threads as a group when all of the first values must be written to the shared memory 105 before any thread in the second set of threads reads any of the first values, effectively implementing a barrier between the first instructions executed by the first threads and the second instructions executed by the second threads.

The unit 165 reads the first values simultaneously with the first flags from the memory locations 101 and 102 and, when the flags indicate the first values are valid, the set of second threads processes the first values according to second instructions to produce second values. In an embodiment, if a particular thread executing in the unit 165 will process values stored in the memory locations 101 and 102, the thread will poll the corresponding flags stored in the memory locations 101 and 102. In an embodiment, the thread waits for both flags to indicate the values are valid before beginning processing according to the second instructions. In another embodiment, the thread begins processing, according to the second instructions, when the flag stored in the memory location 101 changes state and waits for the flag stored in the memory location 102 to change state when an instruction in the second instructions is reached that requires the value(s) stored in the memory location 102.

As each thread in the second set of threads completes processing, the thread writes value(s) to the memory location 111 or 112 simultaneously with toggling the flags stored in the memory locations 111 or 112 from the first state to the second state. A third set of threads executing third instructions in the unit 160 reads the second values from the memory locations 111 and 112 and, when the respective flags indicate the second values are valid, each thread in the third set of threads processes at least one of the second values according to the third instructions to produce third values. The third set of threads writes the third values to the memory locations 101 and 102 of the shared memory 105 simultaneously with toggling the first flags stored in the memory locations 101 and 102. In an embodiment, the first set of threads and the third set of threads are the same set of threads.

The first values stored in the memory locations 101 and 102 are reused and overwritten with the third values and the first flags are toggled back to the same state to which the first flags were initialized. However, the flag management unit 120 may not initialize all of the flags again before the third set of threads are executed. Instead, the flags are initialized once for an entire program including at least the first, second, and third instructions. In one embodiment, each new packet is written to a different memory location in an "array" available for the program within the shared memory 105 until all of the memory locations in the array have been written. After the entire array has been written, writing may "wrap" and begin overwriting memory locations in the array. The number of memory locations in the array and/or the ability to wrap is application-specific and is determined to guarantee that only the memory locations that have been consumed are overwritten. In contrast, a conventional technique writes each memory location once and does not reuse any memory locations. Therefore, a greater number of memory locations are needed to execute the same program using the conventional technique.

Figure 1D:
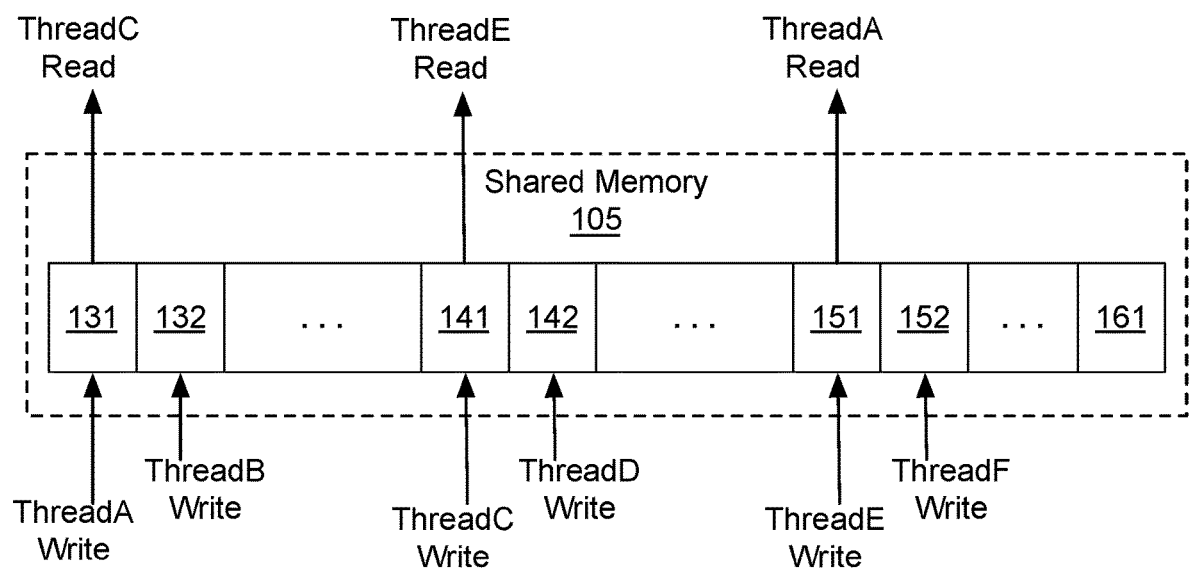
FIG. 1D illustrates a conceptual diagram of shared memory communication using a circular buffer, in accordance with an embodiment.

FIG. 1D illustrates a conceptual diagram of shared memory communication using a circular buffer, in accordance with an embodiment. In one embodiment, a selected set of memory locations in the shared memory 105 are configured as a circular array and the flags stored in memory locations that are initialized to the same state. For example, as shown in FIG. 1D, memory locations 131, 132 through 141, 142 through 151, and 152 through 161 are initialized to the first state. In other embodiments, fewer or more memory locations in the shared memory 105 may be included in the circular array. The memory locations 131 and 132 are written with packets by threadA and threadB and the associated flags stored in the memory locations 131 and 132 are toggled from the first state to the second state. ThreadC polls the memory location 131 by simultaneously reading the value and the flag stored in this location until it determines that the flag is in the second state. ThreadC processes the values and writes second values to a memory location 141 and simultaneously toggles the flag stored in the memory location 141. ThreadC may process one or more additional values along with the value read from the memory location 131. ThreadD writes other values to the memory location 142.

After determining that the flag stored in the memory location 141 is in the second state, threadE may begin processing the second values. Because the second values were obtained in the same transaction when the flag was read from the memory location 141, a separate read to obtain the second values is unnecessary. ThreadE processes the second values and writes third values to a memory location 151 and simultaneously toggles the flag stored in the memory location 151. ThreadF writes other values to the memory location 152. ThreadF may read and process values stored in the memory location 141 and/or 142. After determining that the flag stored in the memory location 151 is in the second state, threadA processes the third values and writes fourth values to the memory location 131, wrapping the array and overwriting the previously written values. In another embodiment, instead of reusing threadA, a different thread may process the third values and write fourth values to the memory locations, wrapping the array and overwriting the previously written values. ThreadA toggles the flag stored in the memory location 131 from the second state to the first state simultaneously with writing the fourth values. In another embodiment, threadE toggles the flag stored in the memory location 131 from the second state to the first state simultaneously with writing the third values to the memory location 131, wrapping the array and overwriting the previously written values. In yet another embodiment, one or more additional threads read the third values, generating fourth values that are written to the shared memory 105 simultaneously with toggling associated flags, and so on to generate any number of values in succession before wrapping the array.

Compared with conventional shared memory synchronization techniques, the number of memory locations within the shared memory 105 may be reduced when the number of memory locations may be reused. Additionally, performance may be improved because the flags do not need to be reinitialized before the memory locations are reused. Instead of initializing flags corresponding to single use memory locations, a smaller number of flags for the reduced number of reusable memory locations are toggled to ensure synchronization. Additionally, flag state information is maintained to track the flag state indicating whether the value(s) stored in the memory location are valid or not. In an embodiment, the memory locations comprising the array are stored in an on-chip cache, such as a level 1 (L1) and/level 2 (L2) cache.

Figure 2A:
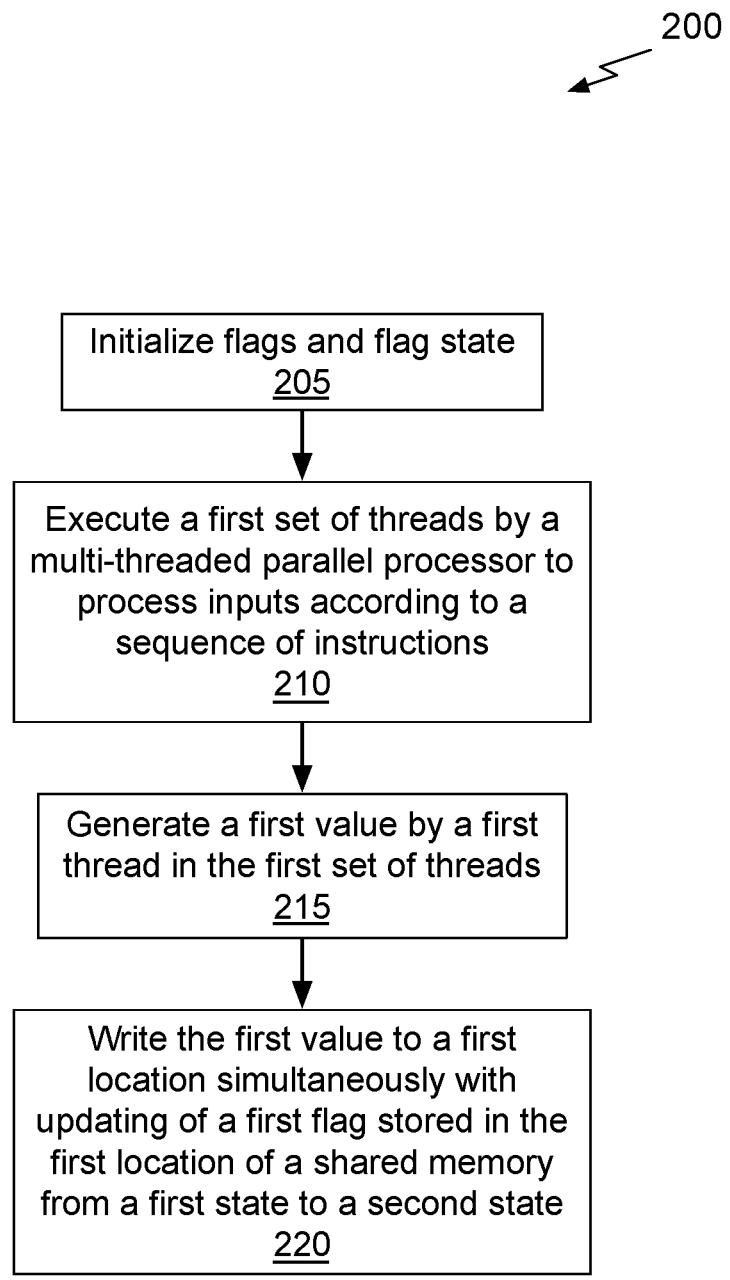
FIG. 2A illustrates a flowchart of a method for synchronizing shared memory communication, in accordance with an embodiment.

FIG. 2A illustrates a flowchart of a method 200 for synchronizing shared memory communication, in accordance with an embodiment. Although method 200 is described in the context of a processing unit, the method 200 may also be performed by a program, custom circuitry, or by a combination of custom circuitry and a program. For example, the method 200 may be executed by a GPU, CPU, or any processor capable of accessing the shared memory 105. Furthermore, persons of ordinary skill in the art will understand that any system that performs method 200 is within the scope and spirit of embodiments of the present disclosure.

At step 205, the flag management unit 120 initializes all of the flags in an array comprising multiple memory locations in the shared memory 105 and initializes the flag state 125. At step 210, a first set of threads is executed by a multi-threaded parallel processor, such as the unit 110 or 160, to process inputs according to a sequence of instructions. At step 215, a first value is generated by a first thread in the first set of threads. At step 220, the first value is written to a first location simultaneously with updating of a first flag stored in the first location of the shared memory 105. The first flag is updated by toggling the first flag. When the flags in the array are initialized to the first state, toggling updates the first flag to the second state. When the shared memory communication wraps from the end of the array to reuse the memory locations, the flags are toggled from the second state back to the first state as each memory location is overwritten. When the shared memory communication wraps from the end of the array the second time, the flags are again toggled from the first state to the second state and so on.

Figure 2B:
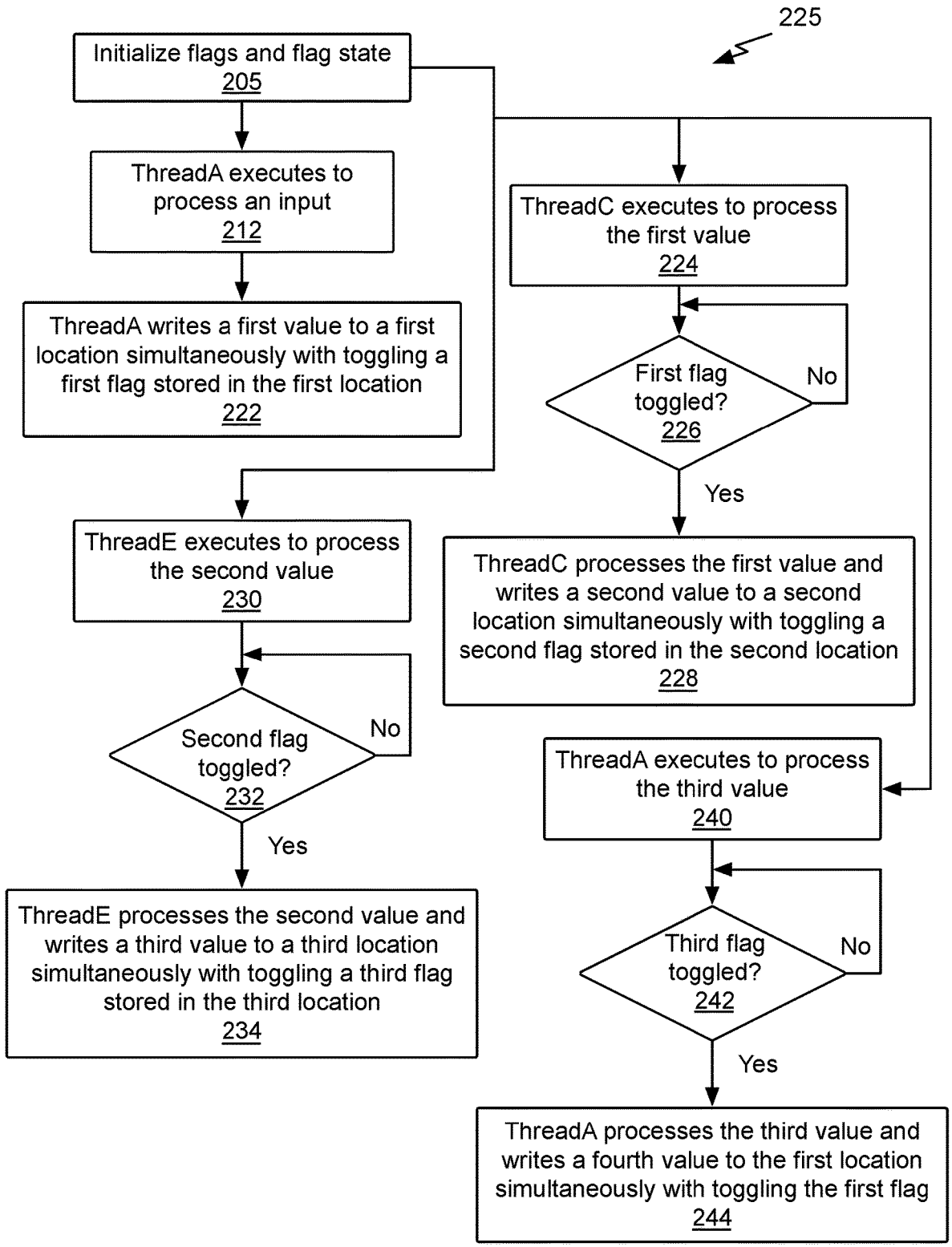
FIG. 2B illustrates another flowchart of a method for synchronizing shared memory communication, in accordance with an embodiment.

FIG. 2B illustrates another flowchart of a method 225 for synchronizing shared memory communication, in accordance with an embodiment. Although method 225 is described in the context of a processing unit, the method 225 may also be performed by a program, custom circuitry, or by a combination of custom circuitry and a program. For example, the method 225 may be executed by a GPU, CPU, or any processor capable of accessing the shared memory 105. Furthermore, persons of ordinary skill in the art will understand that any system that performs method 225 is within the scope and spirit of embodiments of the present disclosure.

At step 205, the flag management unit 120 initializes all of the flags in an array comprising multiple memory locations in the shared memory 105 and initializes the flag state 125. At step 212, threadA executes first instructions to process an input and generate a first value. At step 222, threadA writes the first value to a first memory location 131 simultaneously with toggling a first flag stored in the first memory location 131. At step 224, threadC begins execution of second instructions to process the first value. At step 226, threadC reads the flag stored in the first memory location 131 that corresponds with the first value and indicates whether the first value has been written by threadA. In an embodiment, the flag state information stored in the flag state 125 is used to determine if the flag has changed state indicated that the first value is valid.

If, at step 226, the flag indicates that the first value is not valid, then step 226 is repeated. When, at step 226, the flag indicates that the first value is valid, then, at step 228, threadC reads and processes the first value to generate a second value. At step 228, the second value is written to a second memory location 141 simultaneously with toggling a second flag that is stored in the second memory location 141.

At step 230, threadE begins execution of third instructions to process the second value. At step 232, threadE reads a second flag stored in the second memory location 141 that corresponds with the second value and indicates whether the second value has been written by threadC. If, at step 232, the second flag indicates that the second value is not valid, then step 232 is repeated. When, at step 232, the second flag indicates that the second value is valid, then, at step 234, threadE reads and processes the second value to generate a third value. At step 234, the third value is written to a third memory location 151 simultaneously with toggling a third flag that is stored in the third memory location 151.

At step 240, threadA begins execution of fourth instructions to process the third value. At step 242, threadA reads the third flag stored in the third memory location 151 that corresponds with the third value and indicates whether the third value has been written by threadE. If, at step 242, the third flag indicates that the third value is not valid, then step 242 is repeated. When, at step 242, the third flag indicates that the third value is valid, then, at step 244, threadA reads and processes the third value to generate a fourth value. At step 244, the fourth value is written to the first memory location 131 simultaneously with toggling the first flag that is stored in the first memory location 131.

Storing a single flag in each packet along with one or more values, where the flag is toggled simultaneously with writing the one of more values removes the need for a memory fence. The flag also enables synchronized data exchange between a producer thread and one or more consumer thread(s) through shared memory without requiring a barrier. The flag is toggled for each write and state information is maintained for use by the consumer threads to determine if the state of the flag indicates the values in the same packet as the flag are valid. Memory locations may be reused after all consumers have read values stored in the memory locations. The memory locations may be reused without reinitializing the flags. Reusing the memory locations reduces the number of memory locations needed to execute a program and reduces the cache footprint, thereby reducing the possibility of cache thrashing.

Parallel Processing Architecture

Figure 3:
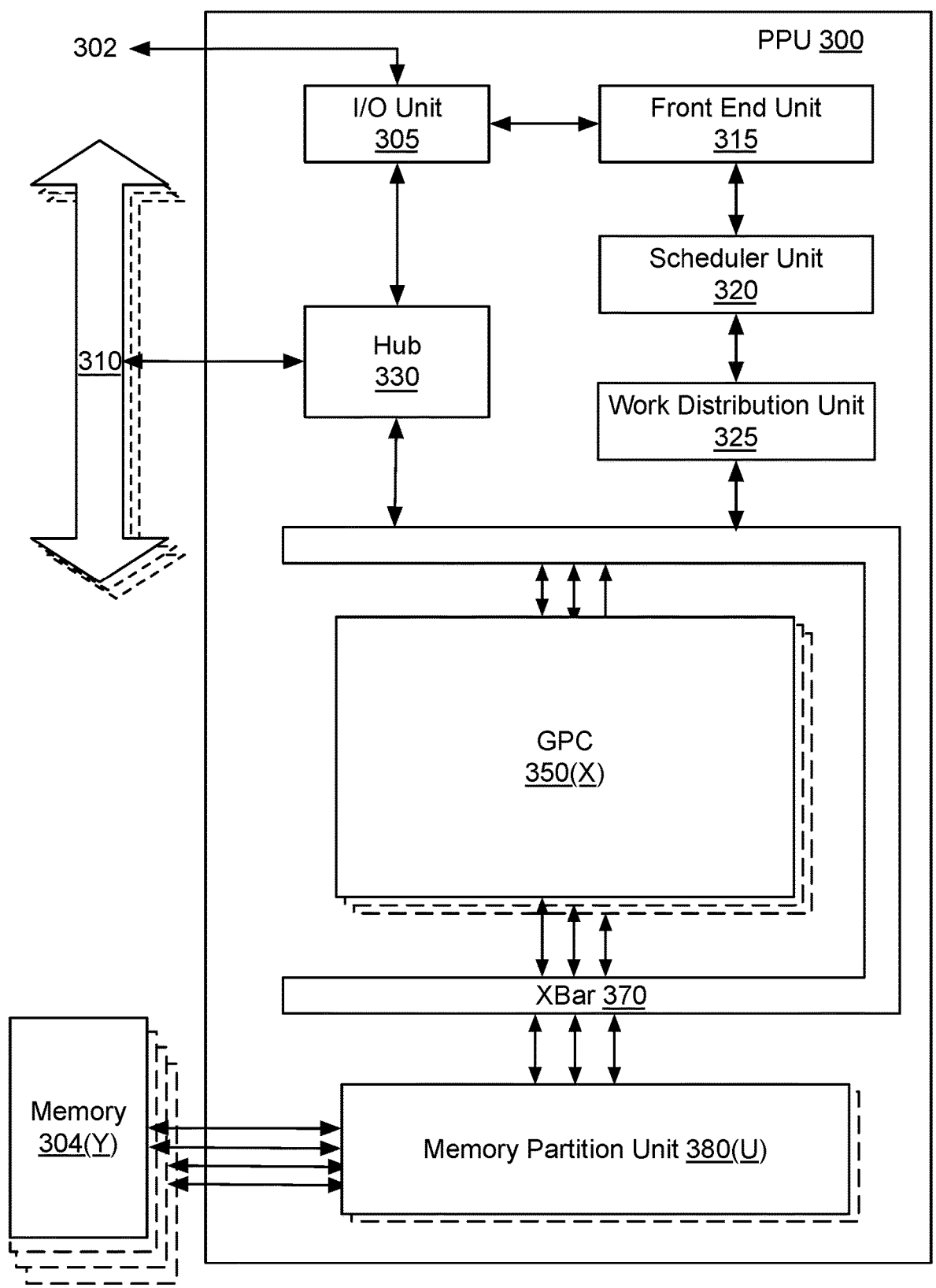
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
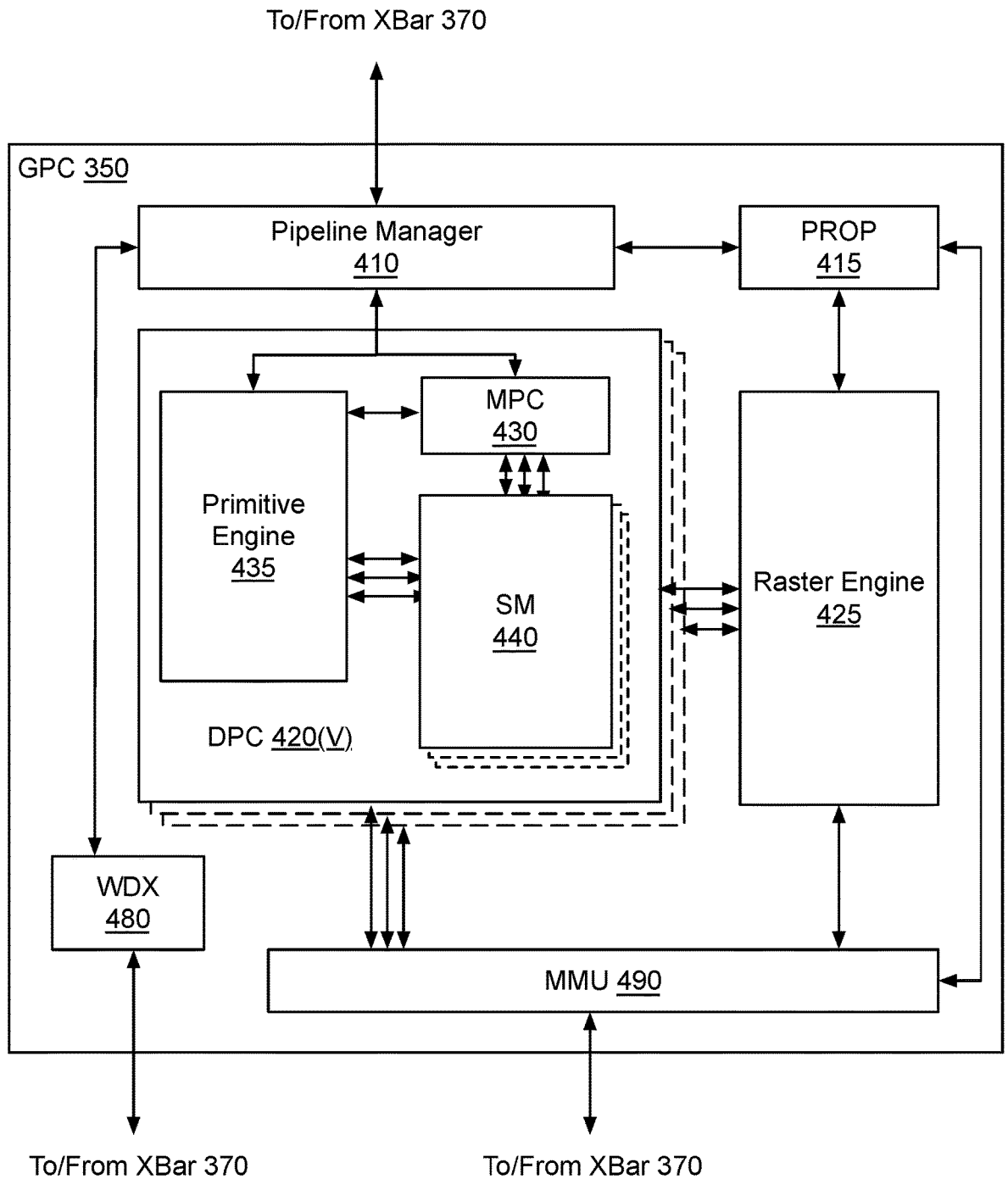
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
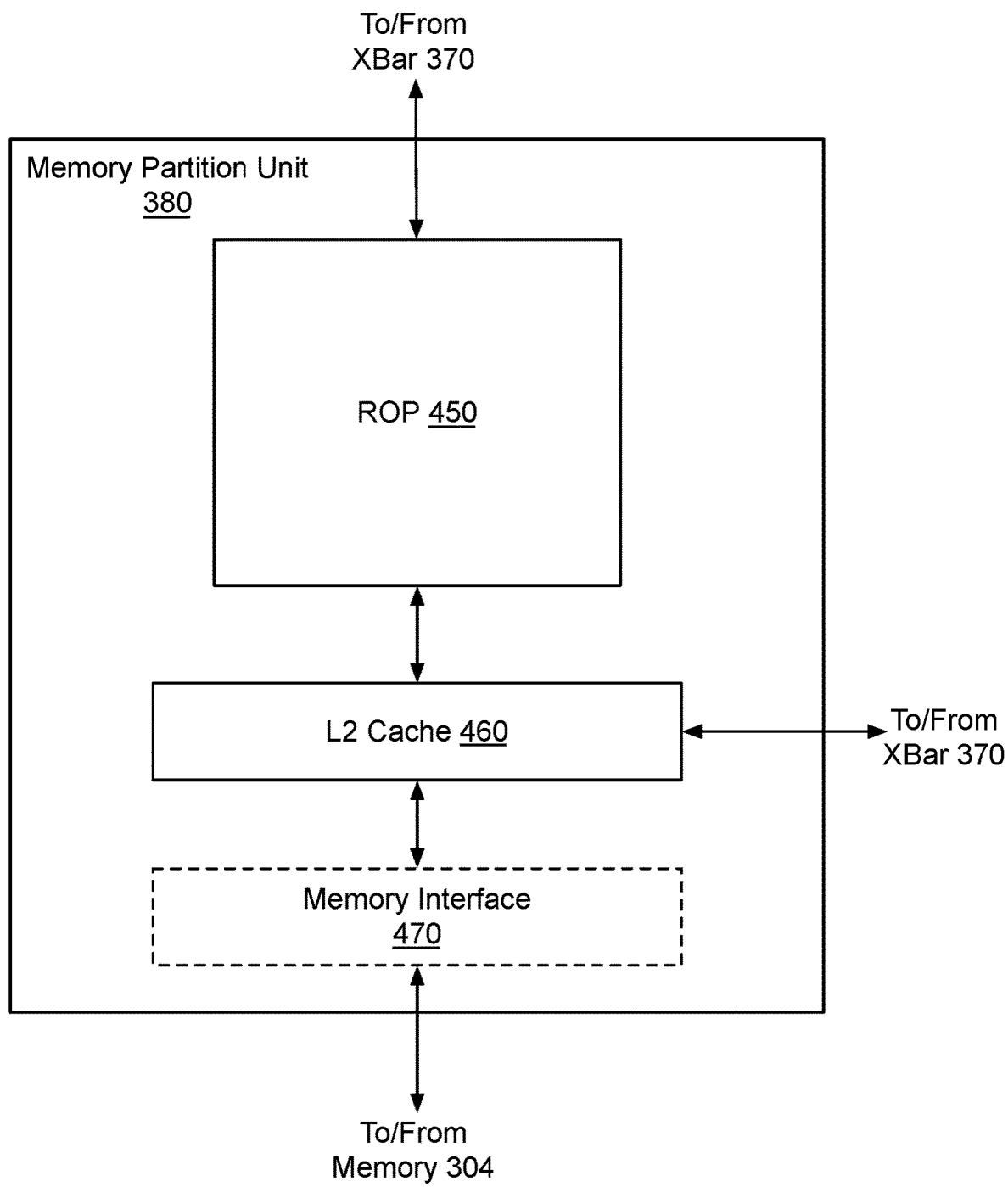
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
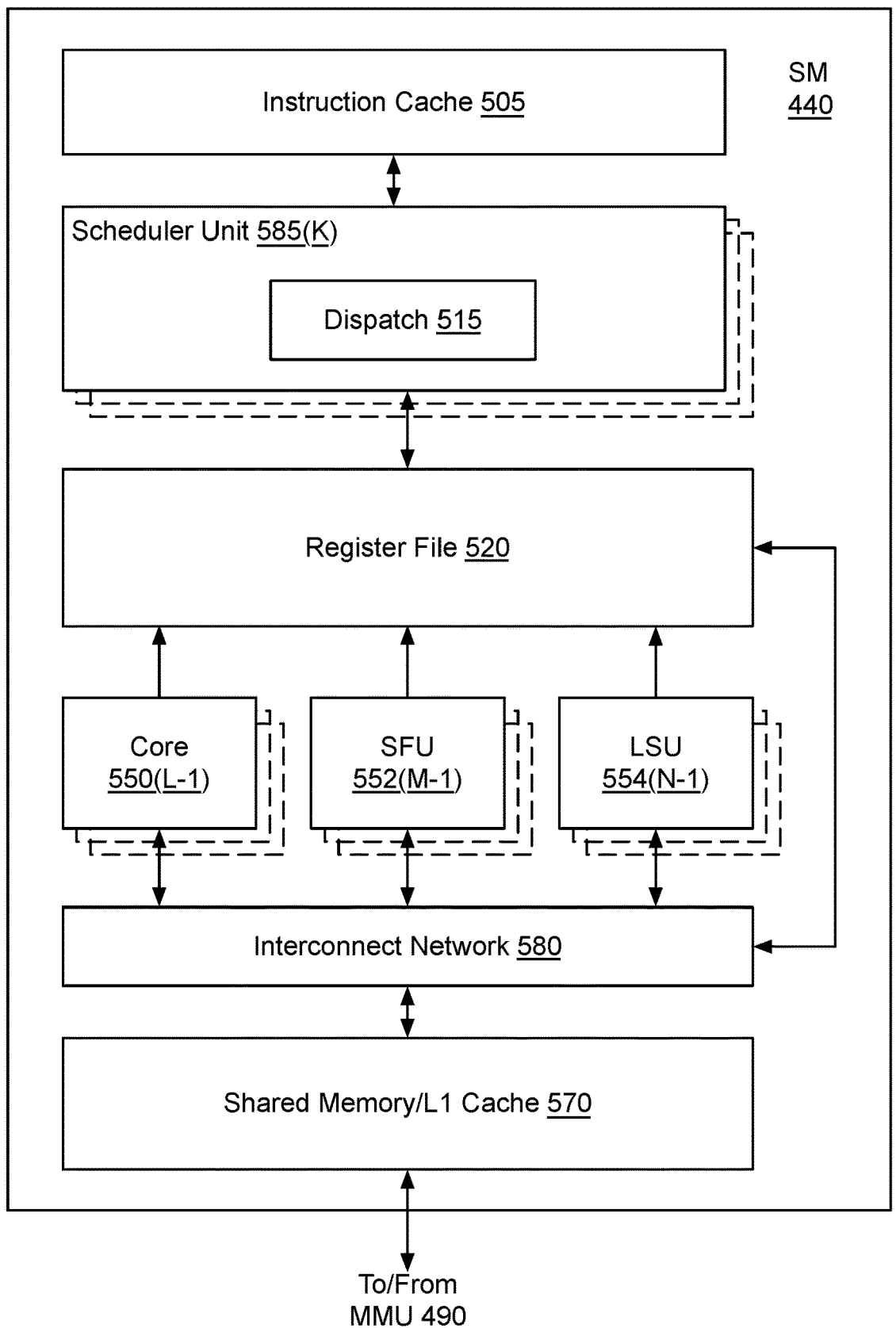
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 585, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 585 receives the tasks from the work distribution unit 325 and manages instruction scheduling for one or more thread blocks assigned to the SM 440. The scheduler unit 585 schedules thread blocks for execution as warps of parallel threads, where each thread block is allocated at least one warp. In an embodiment, each warp executes 32 threads. The scheduler unit 585 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 585 includes two dispatch units 515 that enable two different instructions from the same warp to be dispatched during each clock cycle. In alternative embodiments, each scheduler unit 585 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
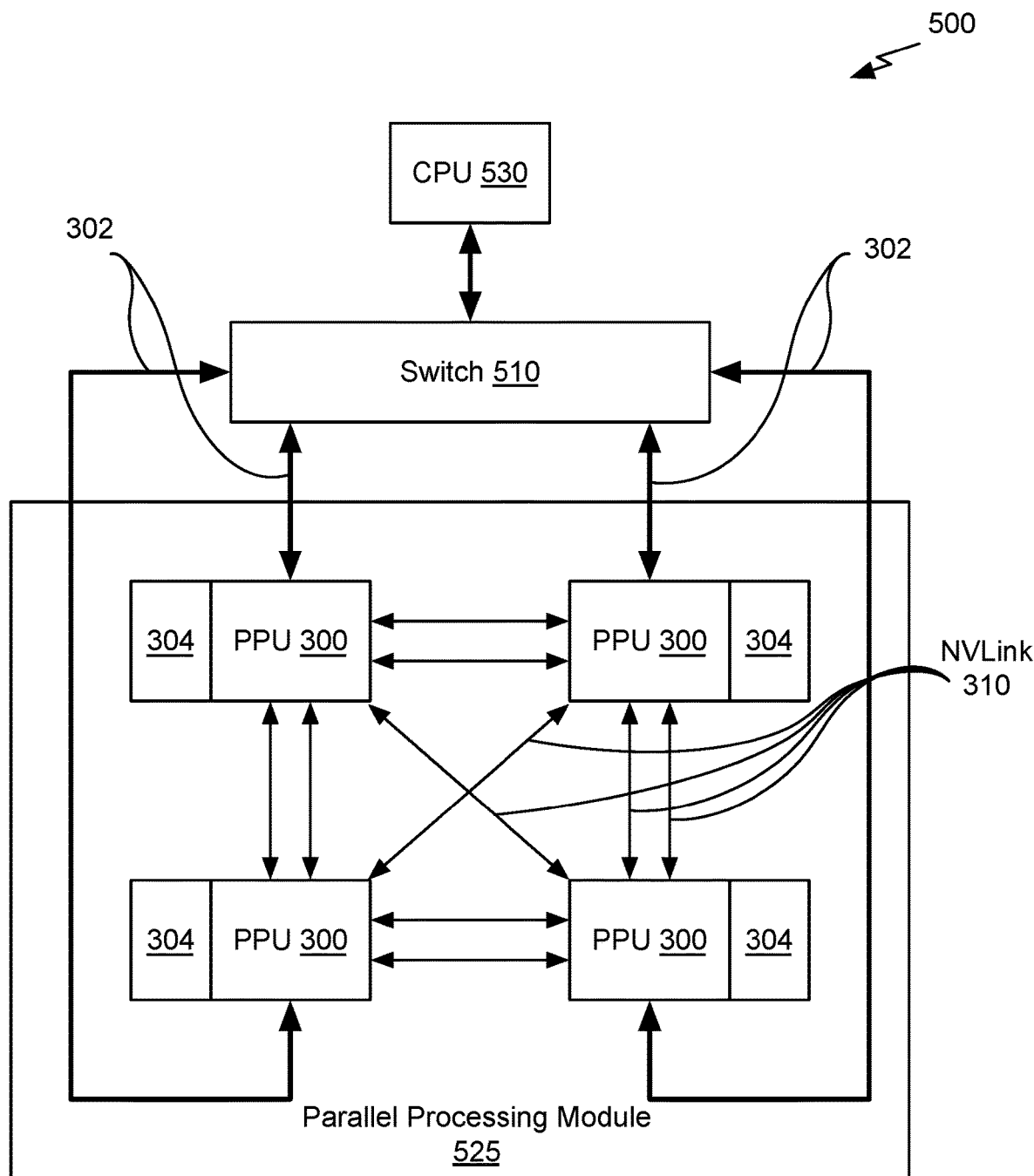
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 200 shown in FIG. 2A and/or the method 225 shown in FIG. 2B. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
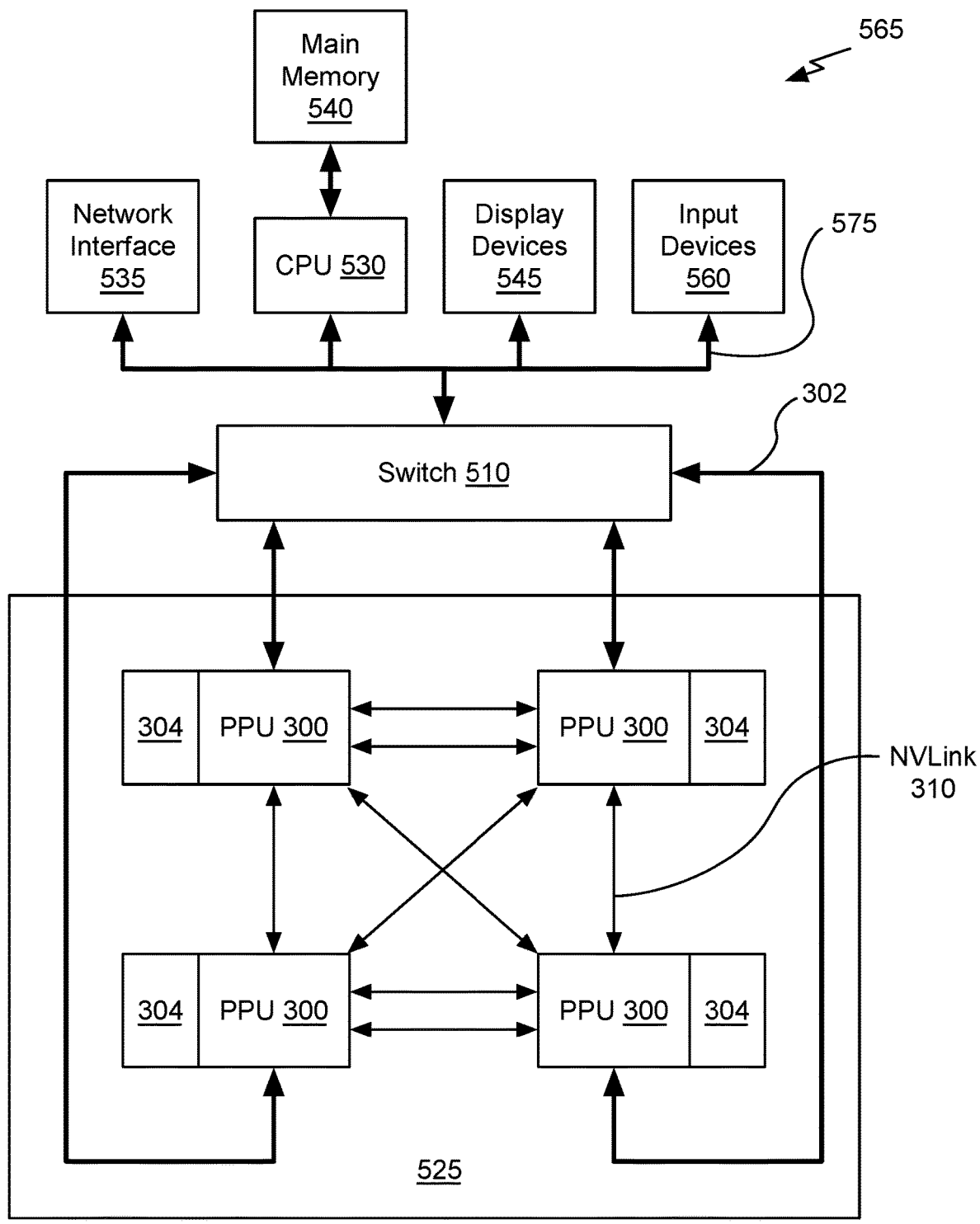
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 200 shown in FIG. 2A and/or the method 225 shown in FIG. 2B.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method comprising:
   executing a set of threads by a multi-threaded parallel processor to process inputs according to a sequence of instructions;
   generating a first value by a first thread in the set of threads;
   writing at least a portion of the first value to a first location of a shared memory simultaneously with toggling a first flag from a first state to a second state, wherein the first location stores only a single flag bit consisting of the first flag and the single flag bit is initialized to the first state responsive to initiating the execution of the set of threads; and
   overwriting the at least a portion of the first value in the first location with a second value simultaneously with toggling the first flag from the second state to the first state.

2. The computer-implemented method of claim 1, wherein one bit of the at least a portion of the first value is not written to a position within the first location and the first flag is stored in the position within the first location.

3. The computer-implemented method of claim 1, further comprising:
   determining, by a second thread, that the first flag has changed from the first state to the second state indicating that the at least a portion of the first value has been written to the first location;
   reading, by the second thread, the at least a portion of the first value from the first location;
   determining, by a third thread, that the first flag has changed from the first state to the second state indicating that the at least a portion of the first value has been written to the first location; and
   reading, by the third thread, the at least a portion of the first value from the first location.

4. A system, comprising:
   a multi-core parallel processor coupled to a shared memory and configured to:
   execute a set of threads to process inputs according to a sequence of instructions;
   generate a first value by a first thread in the set of threads;
   write at least a portion of the first value to a first location in the shared memory simultaneously with toggling a first flag from a first state to a second state, wherein the first location stores only a single flag bit consisting of the first flag and the single flag bit is initialized to the first state responsive to initiating the execution of the set of threads; and
   overwrite the at least a portion of the first value in the first location with a second value simultaneously with toggling the first flag from the second state to the first state.

5. The system of claim 4, wherein one bit of the at least a portion of the first value is not written to a position within the first location and the first flag is stored in the position within the first location.

6. The system of claim 4, wherein the multi-core parallel processor is further configured to:
   determine, by a second thread, that the first flag has changed from the first state to the second state indicating that the at least a portion of the first value has been written to the first location;
   read, by the second thread, the at least a portion of the first value from the first location;
   determine, by a third thread, that the first flag has changed from the first state to the second state indicating that the at least a portion of the first value has been written to the first location; and
   read, by the third thread, the at least a portion of the first value from the first location.

7. A non-transitory computer-readable media storing computer instructions that, when executed by one or more processors, cause the one or more processors to perform the steps of:
   executing a set of threads to process inputs according to a sequence of instructions;
   generating a first value by a first thread in the set of threads;
   writing at least a portion of the first value to a first location of a shared memory simultaneously with toggling a first flag from a first state to a second state, wherein the first location stores only a single flag bit consisting of the first flag and the single flag bit is initialized to the first state responsive to initiating the execution of the set of threads; and
   overwriting the at least a portion of the first value in the first location with a second value simultaneously with toggling the first flag from the second state to the first state.

8. The non-transitory computer-readable media of claim 7, further comprising instructions that, when executed by the one or more processors, cause the one or more processors to perform the steps of:
   determining, by a second thread, that the first flag has changed from the first state to the second state indicating that the at least a portion of the first value has been written to the first location;
   reading, by the second thread, the at least a portion of the first value from the first location;
   determining, by a third thread, that the first flag has changed from the first state to the second state indicating that the at least a portion of the first value has been written to the first location; and reading, by the third thread, the at least a portion of the first value from the first location.

9. The non-transitory computer-readable media of claim 7, wherein one bit of the at least a portion of the first value is not written to a position within the first location and the first flag is stored in the position within the first location.

10. A computer-implemented method comprising:
executing a set of threads by a multi-threaded parallel processor to process inputs according to a sequence of instructions;
generating a first value by a first thread in the set of threads;
writing a portion of the first value to a first location of a shared memory simultaneously with updating a first flag from a first state to a second state, wherein the first flag is initialized to the first state responsive to initiating execution of the set of threads and the first flag replaces a bit of the first value in the first location;
determining, by a third thread, that the first flag has changed from the first state to the second state;
reading, by the third thread, the portion of the first value from the first location before a second flag stored in a second location of the shared memory to be written by a second thread in the set of threads is updated;
writing, by the third thread, an output produced from processing the portion of the first value simultaneously with updating a third flag stored in a third location in the shared memory from the first state to the second state;
processing, by a fourth thread and responsive to the third flag changing from the first state to the second state, the output to produce a fourth value; and
updating the first flag stored in the first location from the second state to the first state simultaneously with writing the fourth value to the first location.

11. The computer-implemented method of claim 10, wherein determining the first flag has changed from the first state to the second state comprises simultaneously reading the first flag and the portion of the first value from the first location by the third thread.

12. The computer-implemented method of claim 11, wherein determining the first flag has changed from the first state to the second state further comprises comparing the first flag to a valid state.

13. The computer-implemented method of claim 10, wherein the portion of the first value and the first flag are encoded as one of a single 16-bit, 32-bit, 64-bit or 128-bit word.

14. The computer-implemented method of claim 10, wherein at least one additional value is associated with the first flag, and further comprising simultaneously writing the at least one additional value to the first location when the portion of the first value is written to the first location.

15. The computer-implemented method of claim 10, wherein execution of the sequence of instructions comprises execution of one or more operations using a neural network.

16. A system, comprising:
a multi-core parallel processor coupled to a shared memory and configured to:
execute a set of threads to process inputs according to a sequence of instructions;
generate a first value by a first thread in the set of threads;
write a portion of the first value to a first location in the shared memory simultaneously with updating a first flag from a first state to a second state, wherein the first flag is initialized to the first state responsive to initiating the execution of the set of threads and the first flag replaces a bit of the first value in the first location;
determine, by a third thread, that the first flag has changed from the first state to the second state;
read, by the third thread, the portion of the first value from the first location before a second flag stored in a second location of the shared memory to be written by a second thread in the set of threads is updated;
write, by the third thread, an output produced from processing the portion of the first value simultaneously with updating a third flag stored in a third location in the shared memory from the first state to the second state;
process, by a fourth thread and responsive to the third flag changing from the first state to the second state, the output to produce a fourth value; and
update the first flag stored in the first location from the second state to the first state simultaneously with writing the fourth value to the first location.

17. The system of claim 16, wherein determining the first flag has changed from the first state to the second state comprises simultaneously reading the first flag and the portion of the first value from the first location by the third thread.

18. The system of claim 17, wherein determining the first flag has changed from the first state to the second state further comprises comparing the first flag to a valid state.

19. The system of claim 16, wherein the portion of the first value and the first flag are encoded as one of a single 16-bit, 32-bit, 64-bit or 128-bit word.

\* \* \* \* \*